United States Patent
Kim et al.

(10) Patent No.: US 9,565,162 B2
(45) Date of Patent: Feb. 7, 2017

(54) ONE-WAY TRANSMISSION AND RECEPTION WITH DELAYED TCP ACK MESSAGE AND MONITORING FOR UDP AND TCP FRAMES

(71) Applicant: ELECTRONICS AND TELECOMMUNICATIONS RESEARCH INSTITUTE, Daejeon (KR)

(72) Inventors: Dongwook Kim, Daejeon (KR); Byunggil Min, Cheongju-si (KR); Yeop Jang, Daejeon (KR); Woonyon Kim, Daejeon (KR); Jungtaek Seo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 16 days.

(21) Appl. No.: 14/726,496

(22) Filed: May 30, 2015

(65) Prior Publication Data

US 2015/0365378 A1 Dec. 17, 2015

(30) Foreign Application Priority Data

Jun. 11, 2014 (KR) .................... 10-2014-0070501

(51) Int. Cl.
*H04L 12/723* (2013.01)
*H04L 29/06* (2006.01)
(Continued)

(52) U.S. Cl.
CPC ......... *H04L 63/0245* (2013.01); *H04L 47/193* (2013.01); *H04L 47/323* (2013.01);
(Continued)

(58) Field of Classification Search
None
See application file for complete search history.

(56) References Cited

U.S. PATENT DOCUMENTS 7,065,482 B2 * 6/2006 Shorey ............... H04L 12/2602 703/2
2002/0161920 A1 * 10/2002 Etoh ...................... H04L 41/12 709/238

(Continued)

FOREIGN PATENT DOCUMENTS

| | | |
|---|---|---|
| JP | 2004-201032 A | 7/2004 |
| KR | 10-2011-0040004 A | 4/2011 |
| KR | 10-1334240 B1 | 11/2013 |

*Primary Examiner* — Venkat Perungavoor
(74) *Attorney, Agent, or Firm* — LRK Patent Law Firm (57) ABSTRACT

A one-way data transmission and reception system and method, which mitigate the problem of a buffer overflow that may occur on a reception system while also mitigating the problem of data loss caused by a link error that may occur in the unidirectional line of a physical one-way data transmission system. The one-way data transmission system includes a first interface unit connected to a first network. A second interface unit is unidirectionally connected to a reception system connected to a second network. An interface integration module unit transmits a delayed Transmission Control Protocol (TCP) Acknowledgement (ACK) frame to a TCP session established with a device of the first network unit through the first interface unit, and transmits one or more identical data frames to the reception system through the second interface unit.

17 Claims, 7 Drawing Sheets

(51) Int. Cl.
    *H04L 12/823* (2013.01)
    *H04L 29/08* (2006.01)
    *H04L 12/801* (2013.01)
    H04L 12/741 (2013.01)
    H04L 29/12 (2006.01)

(52) U.S. Cl.
    CPC ...... *H04L 63/0209* (2013.01); *H04L 63/0281* (2013.01); *H04L 63/1408* (2013.01); *H04L 67/14* (2013.01); H04L 61/6022 (2013.01); H04L 61/6063 (2013.01); H04L 63/101 (2013.01); H04L 63/105 (2013.01)

(56) References Cited

U.S. PATENT DOCUMENTS

| | | | |
|---|---|---|---|
| 2003/0014705 A1* | 1/2003 | Suzuki | H04L 1/0045 714/748 |
| 2003/0188001 A1* | 10/2003 | Eisenberg | H04L 29/06 709/229 |
| 2005/0083917 A1* | 4/2005 | Okamoto | H04L 29/06 370/352 |
| 2008/0002595 A1* | 1/2008 | Rao | H04L 43/18 370/252 |
| 2008/0022000 A1* | 1/2008 | Furuya | H04L 12/2854 709/228 |
| 2011/0116483 A1* | 5/2011 | Lee | H04L 1/1887 370/338 |
| 2011/0145426 A1* | 6/2011 | Miyajima | H04L 63/0272 709/230 |
| 2012/0151075 A1 | 6/2012 | Mraz et al. | |
| 2012/0331300 A1* | 12/2012 | Das | H04L 69/164 713/176 |
| 2014/0059216 A1* | 2/2014 | Jerrim | H04L 67/104 709/224 |

* cited by examiner

```
Algorithm1. Identical Packet Filrering
1:  Input
2:     P1: a new packet received from the Interface (76)
3:     P2: a previous packet received from the Interface (76)
4:  begin procedure
5:     if len(P1)! = len(P2) then
6:        go to forwarding:
7:     end if
8:     P3 = P1 XOR P2
9:     P2 = P1
10:    If all bits in P3 are '0' then
11:       go to forwarding:
12:    else discard P1
13:    end if
14:    forwarding:
15:       if type(P1) == UDP then
16:          forward P1 towards Component2 (62)
17:       else if type(P1) == TCP then
18:          forward P1 towards Application (70)
19:       end if
20: end procedure
```

ONE-WAY TRANSMISSION AND RECEPTION WITH DELAYED TCP ACK MESSAGE AND MONITORING FOR UDP AND TCP FRAMES

CROSS REFERENCE TO RELATED APPLICATION

This application claims the benefit of Korean Patent Application No. 10-2014-0070501, filed Jun. 11, 2014, which is hereby incorporated by reference in its entirety into this application.

BACKGROUND OF THE INVENTION

1. Technical Field

The present invention relates generally to a one-way data transmission and reception system and method and, more particularly, to a system and method that enable reliable one-way data transfer between a transmission system and a reception system that are connected via a single hop using a wired/wireless one-way interface.

2. Description of the Related Art

In order to fundamentally prevent intrusion from a network having a low security level into a network having a high security level, it is general practice to operate networks by physically separating networks having high security levels from networks having low security levels.

Figure 1:
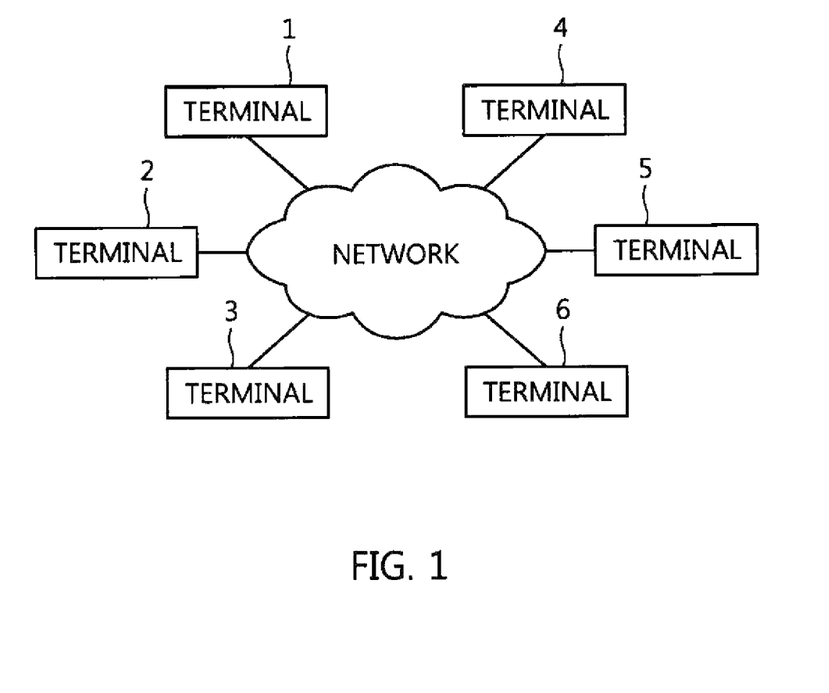
FIG. 1 is a diagram illustrating a network before physical network separation is applied.
Figure 2:
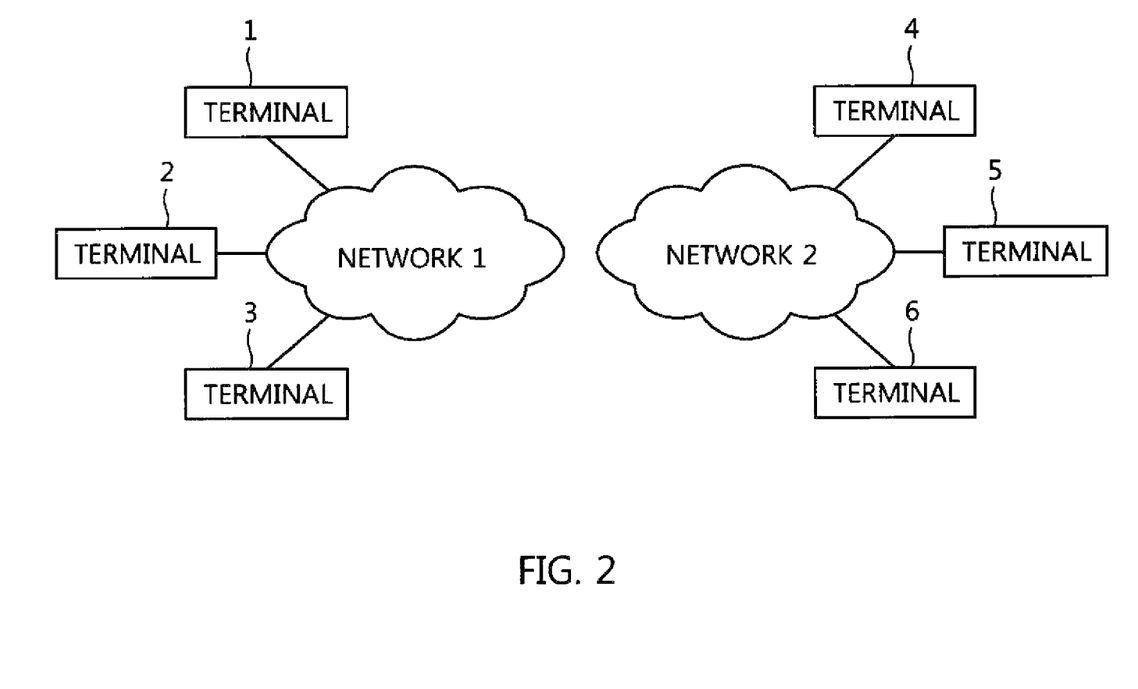
FIG. 2 is a diagram illustrating a network after physical network separation has been applied.

However, completely and physically separating networks having different security levels makes it difficult to transfer data from a terminal in a network having a high security level to a terminal in a network having a low security level, or from a terminal in a network having a low security level to a terminal in a network having a high security level. For example, FIG. 1 illustrates a network before physical network separation is applied, and FIG. 2 illustrates a network after physical network separation has been applied. In FIG. 1, terminals 1, 2, and 3 may use Transmission Control Protocol (TCP)-based or User Datagram Protocol (UDP)-based data transfer programs so as to transfer data to terminals 4, 5, and 6, respectively. However, if network separation is realized, as shown in FIG. 2, the transmission of data between networks is impossible.

Figure 3:
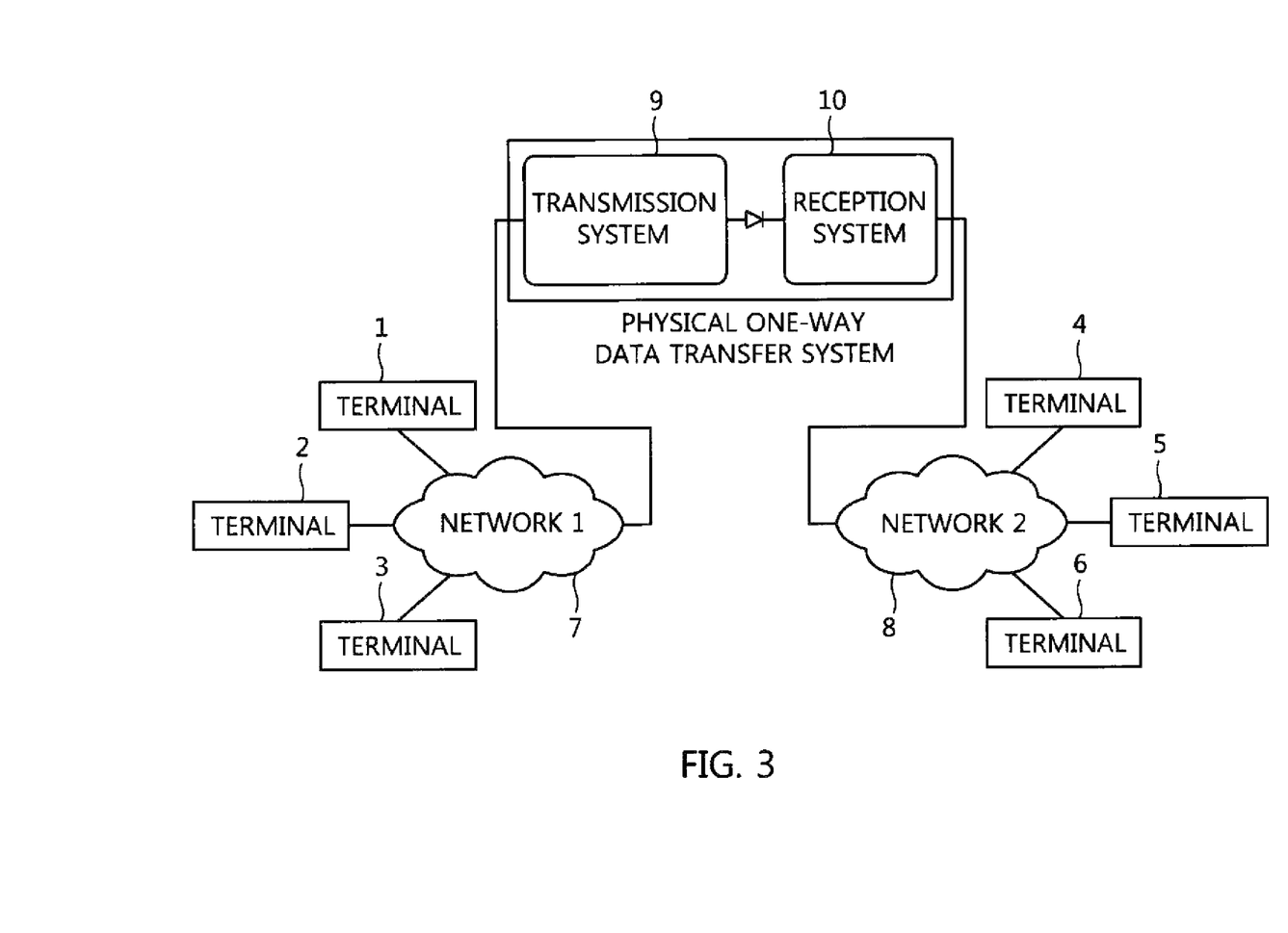
FIG. 3 is a diagram showing a conventional physical one-way data transmission system.

Physical one-way data transfer technology refers to technology for supporting one-way data transfer between networks. As related preceding technology, U.S. Patent Application Publication No. 2012-0151075 is disclosed. An example of the application of physical one-way data transfer technology is shown in FIG. 3. In FIG. 3, a physical one-way data transfer system includes a transmission system 9 and a reception system 10. The transmission system 9 is connected to a first network 7 and the reception system 10 is connected to a second network 8. Further, for a connection between the transmission system 9 and the reception system 10, only a unidirectional physical line is permitted, and a physical line from the reception system 10 to the transmission system 9 is disconnected.

The transmission system 9 receives data that is transmitted from the terminals 1, 2, and 3 of the first network 7 to the terminals 4, 5 and 6 of the second network 8 during the transmission of the data, and transmits the data to the reception system 10. At this time, the unidirectional physical line is used. The reception system 10 transmits the received data to the terminals 4, 5 and 6 of the second network 8.

In this way, the physical one-way data transfer technology is advantageous in that it can support TCP- or UDP-based data transfer between networks to which physical network separation is applied. However, current physical one-way data transfer technology is vulnerable to the loss of data frames.

The reason why the technology is vulnerable to the loss of data frames is described using data transfer between terminating devices by way of example. In an environment in which six devices A-B-C-D-E-F are connected in an end-to-end manner via a physical line, A attempts to transmit data to F, and B, C, D, and E become intermediating devices acting as routers to participate in the transmission of data. During this data transmission procedure, the loss of data may occur, and the reason for this is chiefly divided into two factors.

First, data loss attributable to a link error may occur. An error may be caused in a received signal due to the problem of a physical line or noise, resulting in the loss of data bits. When an IEEE 802.3-based Media Access Control (MAC) protocol is used, C calculates Cyclic Redundancy Check (CRC) of a received data frame, checks whether an error has occurred, and if a data frame having a bit error is received, deletes the corresponding frame. That is, while A is transmitting data to F, data loss of a predetermined portion may occur in sections A-B, B-C, C-D, D-E, and E-F of the physical line.

Second, data loss caused by network congestion may occur. When a network is congested during the transmission of data from A to F and then the amount of data that has reached B to F becomes greater than the amount of data that can be processed by B to F, a buffer overflow problem may occur in B to F. Due to this, the loss of data may occur.

Accordingly, in order to guarantee reliable data transfer between terminating devices, a TCP may be used. In this case, after A has transmitted TCP data, retransmission is performed until a TCP Acknowledgment (ACK) frame for the data is successfully received, thus guaranteeing lossless data transmission. Below, a case where a physical one-way data transfer system is applied will be described. In the above-described example, it is assumed that C is the transmission system of the one-way data transfer system, and D is the reception system of the one-way data transfer system. In this case, since the connection of a physical line from D to C is not present, the use of TCP enabling bidirectional (two-way) communication is impossible, and thus lossless data transmission from A to F cannot be provided. That is, the loss of data frames between B to F directly influences loss of data on the application layer of F. This does not cause any special problem in the case of an application program using a UDP which accepts a predetermined amount of data loss, but may cause a problem in the case of a program using a TCP which performs lossless data transmission. In other words, an example is assumed in which a single piece of data having a size of 15 Mbytes (e.g., a compressed file) is transferred from the terminal 1 to the terminal 4 of FIG. 3 using a TCP-based transfer program. Further, it is assumed that the maximum size of the data frame of IEEE 802.3 is about 1500 bytes, and a data file of 15 Mbytes is divided into about 100 data frames and transferred using TCP. In this case, due to the problem of a physical line between the transmission system 9 and the reception system 10 of the physical one-way data transfer system or the problem of data loss caused by congestion in the first network 7 or the second network 8, when even a single data frame among 100 data frames is not received (that is, when the terminal 4 receives 99 data frames), it is impossible to reconstruct the received data frames into original data of 15 Mbytes, thus resulting in the same problem as that obtained when the entirety of original data is not received.

In order to mitigate the problem of data loss in a communication system, the following technology may be utilized. In order to mitigate the loss of data caused by error, the transmission system 9 may use a Forward Error Correction (FEC) technique for adding a predetermined amount of redundancy information to data frames to be transmitted and correcting an error. In order to solve the problem of data loss caused by network congestion, the buffer size of a network node or a destination node may be increased, or technology disclosed in U.S. Patent Application Publication No. 2012-0151075 may be used. However, even if the above-described patent is utilized, the problem of data loss caused by link error between the transmission system 9 and the reception system 10 and the problem of data loss caused by the buffer overflow of the reception system 10 may occur. The buffer overflow of the reception system 10 may occur when a data transfer rate between of the terminals 1, 2 and 3 of the first network 7 and the transmission system 9 is greater than a data transfer rate between the reception system 10 and the terminals 4, 5 and 6 of the second network 8.

As another related preceding technology, Korean Patent No. 10-1334240 discloses technology for unidirectionally transmitting data from a network having a high security level to a network having a low security level and receiving the results of verification of data through a separate line.

SUMMARY OF THE INVENTION

Accordingly, the present invention has been made keeping in mind the above problems occurring in the prior art, and an object of the present invention is to provide a one-way data transmission and reception system and method, which mitigate the problem of a buffer overflow that may occur on a reception system while also mitigating the problem of data loss caused by a link error that may occur in the unidirectional line of a physical one-way data transmission system.

In accordance with an aspect of the present invention to accomplish the above object, there is provided a one-way data transmission system, including a first interface unit connected to a first network; a second interface unit unidirectionally connected to a reception system connected to a second network; and an interface integration module unit for transmitting a delayed Transmission Control Protocol (TCP) Acknowledgement (ACK) frame to a TCP session established with a device of the first network unit through the first interface unit, and transmitting one or more identical data frames to the reception system through the second interface unit.

The interface integration module unit may include a frame monitoring unit for monitoring whether a frame received from the first interface unit is an accepted frame, transferring an accepted frame to a frame generation unit if the accepted frame is a User Datagram Protocol (UDP) frame, and transferring the accepted frame to the frame generation unit and to a management unit if the accepted frame is a TCP frame; the frame generation unit for generating one or more identical frames for the frame received from the frame monitoring unit, and transferring the identical frames to the second interface unit; and the management unit for managing a TCP session to be established between a device of the first network and a device of the second network, based on the TCP frame received from the frame monitoring unit.

The frame monitoring unit may be configured to, if the received frame is a frame corresponding to a session included in a preset whitelist, determine the frame to be the accepted frame and to, if the accepted frame is a UDP frame, recalculate a data transfer rate for a current UDP session, and transfer the UDP frame to the frame generation unit when the recalculated data transfer rate is less than a data transfer rate accepted for the corresponding session.

The frame generation unit may be configured to, if the frame received from the frame monitoring unit is a TCP frame, generate one or more identical TCP frames based on a buffer state of the second interface unit.

The frame generation unit may be configured to, if the frame received from the frame monitoring unit is a UDP frame, generate one or more identical UDP frames based on a buffer state of the second interface unit and an importance level of the UDP frame.

The frame generation unit may set a destination Media Access Control (MAC) address of a frame to be transmitted to the second interface unit to a MAC address of a fourth interface unit of the reception system unidirectionally connected to the second interface unit, and transfer the frame to the second interface unit.

When the second interface unit and the fourth interface unit perform one-way communication via a wireless link, the frame generation unit may set a destination MAC address of a frame to be transmitted to the second interface unit to a broadcast MAC address, and transfer the frame to the second interface unit.

The interface integration module unit may further include a TCP session management table including a source IP address indicating an IP address of a device of the first network that made an actual TCP session establishment request, a source port indicating a port of the device of the first network that made the actual TCP session establishment request, a destination IP address indicating an IP address of a device of the second network that is a destination IP address of the actual TCP session, a destination port indicating a port of a device of the second network that is a destination port of the actual TCP session, an RTT1 indicating a round trip time (RTT) between the device of the first network and the transmission system, a current state used to track TCP state transition, and an expiration time indicating a duration in which the current state is maintained.

The management unit may be configured to, if a TCP ACK frame is received from an upper layer, search the TCP session management table for an entry corresponding to a destination IP address and a destination port of an IP header and a TCP header of the TCP ACK frame and obtain the RTT1, and to, if the RTT1 is greater than an NRTT indicating an RTT required between the transmission system and a TCP transmission device of the first network, set a delay time for the TCP ACK frame to "0 (zero)" and if the RTT1 is less than the NRTT, set the delay time for the TCP ACK frame to "NRTT−RTT1."

The one-way data transmission system may further include an application program unit for storing, an application program required to establish or delete a TCP session with a device of the first network.

In accordance with another aspect of the present invention to accomplish the above object, there is provided a one-way data reception system, including a third interface unit connected to a second network; a fourth interface unit unidirectionally connected to a second interface unit of a transmission system connected to a first network through a first interface unit; an interface integration module unit configured to select one from among identical data frames of data frames received from a second interface unit of the transmission system received through the fourth interface unit; and an application program unit configured to receive a TCP frame from the interface integration module unit and establish a TCP session with a device of the second network.

The interface integration module unit may include a frame monitoring unit for identifying a single frame among the identical frames of the received data frames, transferring the identified frame to an address setting unit if the identified frame is a UDP frame, and transferring the identified frame to the application program unit if the identified frame is a TCP frame; and the address setting unit for setting a destination MAC address of the received UDP frame to a MAC address of a next hop IP address, and transferring the MAC address to the third interface unit.

The application program unit may establish or delete a TCP session with a device of the second network using an IP header and a TCP header of the received TCP frame, and manage a TCP session to be established between a device of the first network and a device of the second network, based on information of the received TCP frame.

The application program unit may further include a TCP session management table including a source IP address indicating an IP address of a device of the first network that made an actual TCP session establishment request, a source port indicating a port of the device of the first network that made the actual TCP session establishment request, a destination IP address indicating an IP address of a device of the second network that is a destination IP address of the actual TCP session, a destination port indicating a port of a device of the second network that is a destination port of the actual TCP session, an RTT2 indicating a round trip time (RTT) between the transmission system and a device of the second network, a current state used to track TCP state transition, and an expiration time indicating a duration in which the current state is maintained.

The application program unit may be configured to, if a new TCP synchronization (SYN) frame is received, check whether an entry matching the source IP address, the source port, the destination IP address, and the destination port is present in the TCP session management table, with reference to a TCP header and an IP header of the new TCP SYN frame, and to, if the entry is not present in the TCP session management table, newly generate an entry including the source IP address, the source port, the destination IP address, and the destination port and insert the newly generated entry into the TCP session management table.

When the new entry is generated, the application program unit may establish a TCP session with the device of the second network having information about the destination IP address and the destination port of the entry, allocate a buffer to the TCP session to be established, and initialize the buffer.

The application program unit may be configured to, if data is present in a head of the buffer, extract the data, eliminate an IP header and a TCP header from the data, and transfer resulting data to the device of the second network through the third interface unit using the established TCP session.

The application program unit may record information of the TCP session management table as log or sends a notification message to a management tool.

The application program unit may be configured to, if it is determined that frame loss has occurred in a specific TCP session, record frame loss as log or send a warning message to a management tool.

In accordance with a further aspect of the present invention to accomplish the above object, there is provided a one-way data transmission and reception method, including transmitting, by a transmission system, a delayed Transmission Control Protocol (TCP) Acknowledgement (ACK) frame to a TCP session established with a device of a first network through a first interface unit, generating, by the transmission system, one or more identical data frames for a frame included in a whitelist, among frames received from the first interface unit, based on one or more of a buffer state of a second interface unit and an importance level of the frame, and transmitting, by the transmission system, the generated data frames to a reception system through the second interface unit; and selecting, by the reception system, one from among the identical data frames of the data frames received from the second interface unit through a fourth interface unit.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention may be variously changed and may have various embodiments, and specific embodiments will be described in detail below with reference to the attached drawings.

However, it should be understood that those embodiments are not intended to limit the present invention to specific disclosure forms and they include all changes, equivalents or modifications included in the spirit and scope of the present invention.

The terms used in the present specification are merely used to describe specific embodiments and are not intended to limit the present invention. A singular expression includes a plural expression unless a description to the contrary is specifically pointed out in context. In the present specification, it should be understood that the terms such as "include" or "have" are merely intended to indicate that features, numbers, steps, operations, components, parts, or combinations thereof are present, and are not intended to exclude a possibility that one or more other features, numbers, steps, operations, components, parts, or combinations thereof will be present or added.

Unless differently defined, all terms used here including technical or scientific terms have the same meanings as the terms generally understood by those skilled in the art to which the present invention pertains. The terms identical to those defined in generally used dictionaries should be interpreted as having meanings identical to contextual meanings of the related art, and are not interpreted as being ideal or excessively formal meanings unless they are definitely defined in the present specification.

Embodiments of the present invention will be described in detail with reference to the accompanying drawings. In the following description of the present invention, the same reference numerals are used to designate the same or similar elements throughout the drawings and repeated descriptions of the same components will be omitted.

Figure 4:
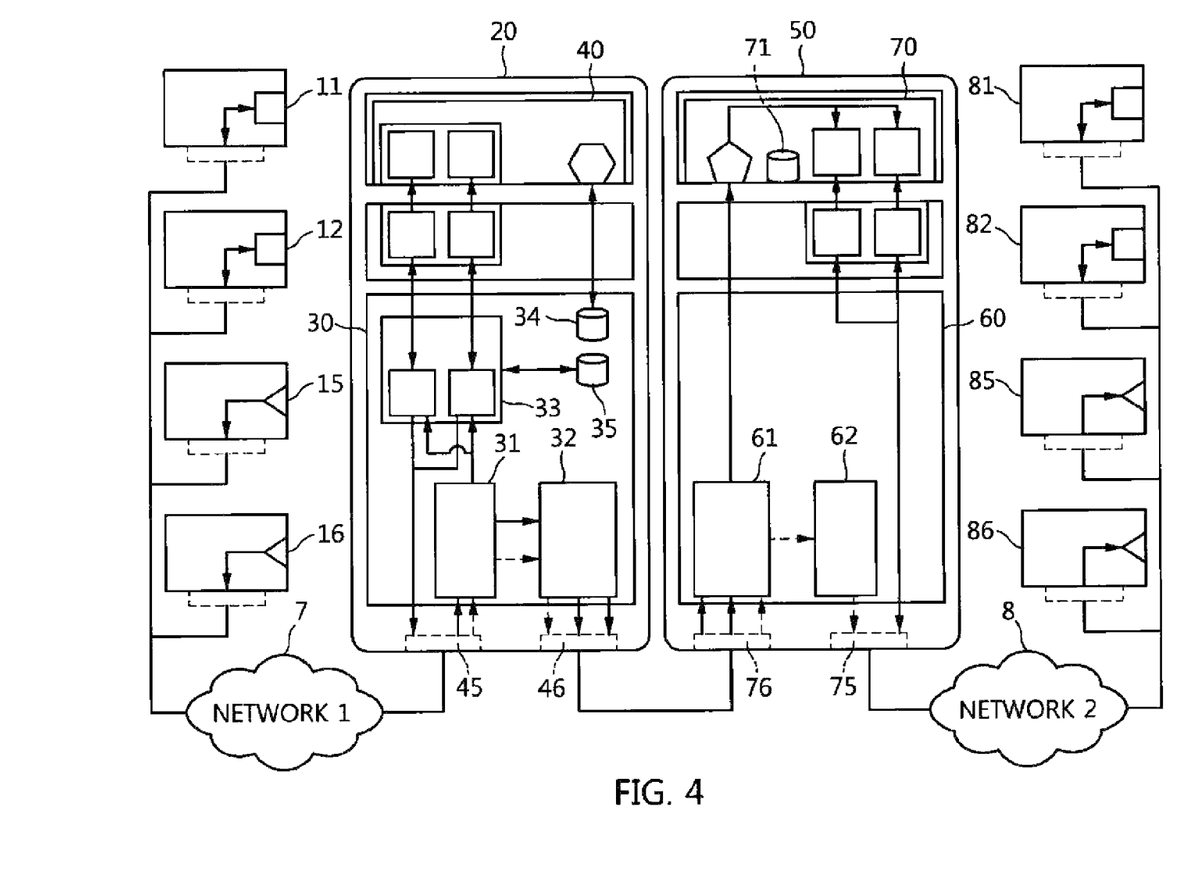
FIG. 4 is a diagram showing an overall configuration including the components of a one-way data transmission system and a one-way data reception system, TCP transmission and reception devices, and UDP transmission and reception devices according to an embodiment of the present invention.

FIG. 4 is a diagram showing an overall configuration including the components of a one-way data transmission system and a one-way data reception system, TCP transmission and reception devices, and UDP transmission and reception devices according to an embodiment of the present invention.

A one-way data transmission system 20 according to an embodiment of the present invention includes an interface integration module unit 30 and an application program 40.

The interface integration module unit 30 is disposed between layer 2 (e.g., Media Access Control (MAC) layer in an Open System Interconnection (OSI) 7 layer model) and an, upper layer (e.g., an IP layer in the OSI 7 layer model when a TCP/IP protocol stack is used).

The transmission system 20 has a first interface unit 45 connected to a first network 7 and a second interface unit 46 used to make a unidirectional connection to a reception system 50. The interface integration module unit 30 manages the first interface unit 45 and the second interface unit 46 in an integrated manner.

Further, the application layer of the transmission system 20 includes an application program 40 functioning to establish a TCP session with TCP transmission devices 11 and 12 in the first network 7 and to set up an environment. That is, the transmission system 20 instead of the device of a second network 8 establishes or deletes a TCP session with the device of the first network 7. For this, the transmission system 20 includes the application program 40 for establishing and deleting TCP sessions. Further, the transmission system 20 manages a whitelist 34 including acceptable UDP sessions and TCP sessions. In this case, the application program 40 may also be referred to as an "application program unit for storing application programs."

In other words, in the transmission system 20, the application program 40 instead of TCP reception devices 81 and 82 establishes TCP sessions with the TCP transmission devices 11 and 12 so that the TCP transmission devices 11 and 12 seem to establish TCP sessions with the TCP reception devices 81 and 82. The application program 40 deletes all TCP data frames received from the TCP transmission devices 11 and 12 after the TCP sessions have been established. Further, the application program 40 provides an environment enabling the whitelist 34 to be set. In this case, the whitelist 34 is set by a manager. A whitelist for UDP sessions includes the IP addresses of UDP transmission devices 15 and 16, the port numbers of the UDP transmission devices 15 and 16, the IP addresses of UDP reception devices 85 and 86, the port numbers of the UDP reception devices 85 and 86, an acceptable data transfer rate, etc. A whitelist for TCP sessions includes the IP addresses of the TCP transmission devices 11 and 12, the port numbers of the TCP transmission devices 11 and 12, the IP addresses of TCP reception devices 81 and 82, the port numbers of the TCP reception devices 81 and 82, Round Trip Time (RTT) information between the reception system 50 and the TCP reception devices 81 and 82, the TCP receive buffer size (TCP receive window size) of the TCP reception devices 81 and 82, etc. Here, RTT denotes an abbreviation of round trip time and typically denotes an elapsed time beginning from the transmission of a data frame and ending with the reception of an Acknowledgment (ACK) signal to the data frame.

In order to establish a TCP session with the TCP transmission device 11 or 12, the application program 40 opens ports corresponding to the ports of all TCP reception devices described in the whitelist 34 for the TCP session, and waits for a session request to be received from the TCP transmission device 11 or 12.

Meanwhile, the interface integration module unit 30 includes a frame monitoring unit (component 1) 31, a frame generation unit (component 2) 32, and a management unit (component 3) 33.

The frame monitoring unit 31 monitors a data frame received from the first interface unit 45. When receiving the frame, the frame monitoring unit 31 analyzes whether the frame corresponds to a session included in the whitelist 34. The frame corresponding to the session included in the whitelist 34 is an accepted frame.

When each accepted UDP frame is received, the frame monitoring unit 31 may recalculate the data transfer rate of a current UDP session and may delete the received UDP frame if the recalculated data transfer rate is greater than a data transfer rate accepted for the current UDP session. The frame monitoring unit 31 transfers only UDP frames that are not deleted to the frame generation unit (component 2) 32.

When each accepted TCP frame is received, the frame monitoring unit 31 individually transfers the TCP frame to the frame generation unit 32 and to the management unit 33.

The frame generation unit 32 generates, for the received TCP frame, one or more identical frames based on the buffer state of the second interface unit 46. For example, the following procedure may be utilized. When the remaining space of the buffer of the second interface unit 46 is equal to or greater than 90% of the entire buffer space, the frame generation unit 32 generates five identical TCP frames including the received TCP frame. Alternatively, when the remaining space of the buffer of the second interface unit 46 is equal to or greater than 70% of the entire buffer space, but is less than 90%, the frame generation unit 32 generates four identical TCP frames including the received TCP frame. When the remaining space of the buffer of the second interface unit 46 is equal to or greater than 50% of the entire buffer space, but is less than 70%, the frame generation unit 32 generates three identical TCP frames including the received TCP frame. When the remaining space of the buffer of the second interface unit 46 is equal to or greater than 30%, but is less than 50%, the frame generation unit 32 generates two identical TCP frames including the received TCP frame. Finally, if the remaining space of the buffer of the second interface unit 46 is less than 30% of the entire buffer space, the frame generation unit 32 transmits only a single original TCP frame.

Meanwhile, the frame generation unit 32 may generate, for a received UDP frame, one or more identical UDP data frames based on the current buffer state of the second interface unit 46 and the importance level of the corresponding UDP frame (e.g., it is possible to examine the type of device for sending warning data, the type of communication port used by the device, the type of warning data that is sent, etc.).

The frame generation unit 32 sets the destination MAC addresses of UDP and TCP data frames to be transmitted to the MAC addresses of the fourth interface unit 76 of the reception system 50, and transfers the MAC addresses to the second interface unit 46. However, when the second interface unit 46 and the fourth interface unit 76 perform one-way communication using a wireless link (e.g., IEEE 802.11 or the like), the frame generation unit 32 sets the destination MAC addresses to broadcast MAC addresses (FF:FF:FF:FF:FF:FF) other than the MAC addresses of the fourth interface unit 76 so as to prevent the MAC layer of the fourth interface unit 76 from sending an ACK.

The management unit 33 may manage information about TCP sessions (e.g., source IP addresses, destination IP addresses, source ports, destination ports, etc.) to be established between the TCP transmission devices 11 and 12 of the first network 7 and the TCP reception devices 81 and 82 of the second network 8, based on the TCP frames received from the frame monitoring unit 31 and an upper layer (e.g., TCP layer), and RTT information between the devices of the first network 7 and the transmission system 20, in a TCP session management table 35. The current state field of the TCP session management table 35 is updated based on a TCP control frame received from the frame monitoring unit 31 or the TCP layer.

Below, the operation of delaying and transmitting a TCP ACK frame received from the upper layer (e.g., TCP layer) of the management unit 33 will be described in detail. Generally, maximum throughput that can be produced in a single TCP session is calculated by the following equation:

$$\text{maximum TCP throughput} = (\text{TCP receive window size}) * 8 / \text{RTT}$$

It can be seen that when the TCP receive buffer size (TCP receive window size) is fixed, the maximum TCP throughput is determined by the RTT. Therefore, in order to decrease TCP throughput between the TCP transmission devices 11 and 12 and the transmission system 20, a method of intentionally lengthening an RTT may be used. For this, when a TCP ACK frame is received from the upper layer (e.g., TCP layer), the management unit 33 retains the corresponding TCP ACK frame and transmits it after a predetermined delay time (a) has elapsed, thus controlling the throughput of the TCP transmission devices 11 and 12. At this time, the throughput is decreased to such an extent that a buffer overflow does not occur in the reception system 50.

For this, when receiving the TCP ACK frame from the TCP layer, the management unit 33 is operated as follows. First, the management unit 33 searches the TCP session management table 35 for an entry corresponding to the destination IP address (e.g., the IP address of a TCP transmission device) and destination port (e.g., the port of the TCP transmission device) of the IP header and the TCP header of the TCP ACK frame, and obtains an RTT1 value (that is, a RTT value between the device of the first network 7 and the transmission system 20). Further, the management unit 33 may load the TCP receive buffer size (TCP receive window size) (RCV_BF1) of the transmission system 20 from the TCP layer. Furthermore, the management unit 33 obtains RTT information (RTT2) between the reception system 50 and the TCP reception device and the TCP receive buffer size (TCP receive window size) (RCV_BF2) of the TCP reception device, which may be found in the whitelist 34 based on the IP address of the TCP reception device of the corresponding entry. Furthermore, the management unit 33 obtains the total number n of TCP sessions that are currently established.

The management unit 33 obtains a new RTT value (NRTT) based on RTT1, RTT2, RCV_BF1, RCV_BF2, and n, as given by the following Equation (1):

$$\text{NRTT} = (n * \text{RTT2} * \text{RCV\_BF1}) / \text{RCV\_BF2} \tag{1}$$

NRTT denotes an RU value currently required between the transmission system 20 and the TCP transmission devices 11 and 12 so as to adjust TCP throughput between the reception system 50 and the TCP reception devices 81 and 82. Further, a final TCP ACK frame delay time (a) is calculated by comparing current RTT1 with NRTT, as follows:

a=0 if RTT1>NRTT
a=(NRTT−RTT1) if RTT1<NRTT

Whenever a TCP ACK frame is received from the upper layer (e.g., the TCP layer), the management unit 33 of the transmission system 20 transmits the corresponding frame after the calculated delay time (a), so that the throughput between the TCP transmission devices and the transmission system is dynamically controlled, thus removing data loss caused by the buffer overflow of the reception system 50.

The RTT between the reception system 50 and the TCP reception devices 81 and 82 is a value varying with the congestion state of the network. Accordingly, in order to prevent a buffer overflow from occurring in the reception system 50, it is necessary to set the corresponding RU value (RTT2) as conservatively as possible when a manager sets the whitelist. Setting the RTT value as conservatively as possible means that the RTT value is set to, for example, a value that is about 1.5 to 2 times as large as an actually measured RTT value between the reception system and the TCP reception devices. Further, upon calculating the RTT value, the amount of data of a UDP frame that is currently transmitted from the transmission system 20 to the reception system 50 (for example, a UDP frame of 0.1 Mbytes is transferred from the transmission system 20 to the reception system 50 per second) may be taken into consideration.

Further, the present invention uses a scheme for simply reducing the throughput of TCP sessions between the transmission system and the transmission devices to 1/n when n TCP sessions are present at a specific time.

Such a scheme for conservatively setting the RTT2 value and reducing TCP throughput to 1/n based on Equation (1) may result in a reduction in the use of an available network bandwidth. However, the present invention is focused on the removal of data loss caused by the buffer overflow of the reception system 50, and such a reduction in the use of an available network bandwidth is a part having a potential for improvement in the future.

As described above, instead of the device of the second network 8, the transmission system 20 establishes or deletes a TCP session with the device of the first network 7. For this, the transmission system 20 includes the application program 40 for establishing and deleting TCP sessions.

In this case, the interface integration module unit 30 of the transmission system 20 functions to monitor data frames received from the first interface unit 45 and the upper layer (e.g., the TCP layer). As a result of the monitoring, if a UDP data frame is received from the first interface unit 45, the interface integration module unit 30 transfers the received UDP data frame to the second interface unit 46 other than an IP layer. From the UDP data frame transferred to the second interface unit 46, one or more identical UDP data frames may generated and transmitted in consideration of the current buffer state of the second interface unit 46 and the importance level of the UDP data frame. As a result of the monitoring, if a TCP data frame is received from the first interface unit 45, the interface integration module unit 30 manages a TCP session to be established between the device of the first network 7 and the device of the second network 8 based on the information of the received TCP data frame.

In order to manage the TCP session, the interface integration module unit 30 may manage the TCP session management table 35 including a source IP address, a source port, a destination IP address, a destination port, an RTT1, a current state, and an expiration time. Here, the source IP address, the source port, the destination IP address, and the destination port respectively denote the IP address and port of the device of the first network 7 that made an actual TCP session establishment request, and the IP address and port of the device of the second network 8 which corresponds to the destination of the actual TCP session. Further, the RTT1 denotes a round trip time between the device of the first network 7 and the transmission system 20 and may be periodically updated. The current state is used to track a TCP state transition, and the expiration time denotes a duration in which the current state is maintained. After the expiration time has elapsed, the corresponding entry is deleted from the TCP session management table 35.

Further, the current state may be composed of five states, that is, SYN_RCVD, SYN_ACK_SENT, ESTABLISH, CLOSE_WAIT, and LAST_ACK.

As a result of the monitoring, if a new TCP synchronization (SYN) frame is received from the first interface unit 45, the interface integration module unit 30 starts to manage the TCP session. That is, if an entry matching the source IP address, the source port, the destination IP address, and the destination port of the TCP header and the IP header of the corresponding TCP SYN frame is not present in the current TCP session management table 35 with reference to the TCP header and the IP header, the interface integration module unit 30 newly generates an entry composed of the source IP address, the source port, the destination IP address, and the destination port, and inserts the generated entry into the TCP session management table 35. Accordingly, the interface integration module unit 30 sets the current state of the entry to SYN_RCVD, sets an RTT1 value to −1, and sets a suitable expiration time. In this case, an available expiration time value may be set to a time for which a typical TCP layer transmits a TCP SYN frame to establish a TCP session and waits for a TCP SYN/ACK frame to be received.

Meanwhile, as a result of the monitoring, if a TCP SYN/ACK frame is received from the IP layer, the interface integration module unit 30 updates the TCP session. In this case, the interface integration module unit 30 sets the current state of the entry to SYN_ACK_SENT, sets an RTT1 value to −1, and sets a suitable expiration time in the similar manner.

Meanwhile, as a result of the monitoring, if a TCP ACK frame is received from the first interface unit 45, the interface integration module unit 30 updates the TCP session. In this case, the interface integration module unit 30 sets the current state of the entry to 'ESTABLISH' and sets the expiration time to −1. The interface integration module unit 30 calculates an RTT value using a time for which a TCP SYN/ACK frame is transmitted and a TCP ACK frame that is a response to the TCP SYN/ACK frame is received, and updates the RTT1 with this value.

As a result of the monitoring, if a TCP finish (FIN) frame is received from the first interface unit 45, the interface integration module unit 30 updates the TCP session. In this case, the interface integration module unit 30 sets the current state of the entry to CLOSE_WAIT, and sets a suitable expiration time in the similar manner.

As a result of the monitoring, if a TCP FIN/ACK frame is received from the IP layer, the interface integration module unit 30 updates the TCP session. In this case, the interface integration module unit 30 sets the current state of the entry to LAST_ACK, and sets a suitable expiration time in the similar manner.

Further, as a result of the monitoring, when a TCP ACK frame is received from the first interface unit 45, the interface integration module unit 30 updates the TCP session. In this case, the interface integration module unit 30 may delete the corresponding entry from the TCP session management table 35.

It is preferable to set a source IP address present in the IP header of each of the TCP SYN/ACK frame, the TCP ACK frame, and the TCP FIN/ACK frame, which are transmitted from the transmission system 20 to the device of the first network 7, to the destination IP address of the corresponding entry rather than the IP address of the transmission system 20.

Meanwhile, as a result of the monitoring, if a TCP data frame or a TCP control frame is received from the first interface unit 45, the interface integration module unit 30 transfers the received TCP frame to the IP layer and to the second interface unit 46. In this case, the application program 40 of the transmission system 20 deletes the received TCP data frame. Meanwhile, in consideration of the current buffer state of the second interface unit 46, the interface integration module unit 30 may generate one or more identical TCP data frames from the TCP frame that is transferred to the second interface unit 46 (via conversion) and may transmit the generated TCP frames to the second interface unit 46 in order to improve the frame reception rate of the reception system 50. In this case, the source MAC address and the destination MAC address of the MAC header of the transferred TCP frame are set to the MAC address of the second interface unit 46 of the transmission system 20 and the MAC address of the fourth interface unit 76 of the reception system 50, respectively. However, when the second interface unit 46 and the fourth interface unit 76 perform one-way communication using a wireless link (e.g., IEEE 802.11 or the like), the destination MAC address is set to a broadcast MAC address (FF:FF:FF:FF:FF:FF) other than the MAC address of the fourth interface unit 76 so as to prevent the MAC layer of the fourth interface unit 76 from sending an ACK.

As a result of the monitoring, if it is determined that the transmission of a delayed TCP ACK frame is required, the interface integration module unit 30 may transmit, for a TCP ACK frame received from the upper layer (for example, TCP layer), a delayed TCP ACK frame via a TCP session established with the device of the first network 7 through the first interface unit 45. By means of this, the problem of a buffer overflow that may occur in the reception system 50 may be mitigated by decreasing the transfer rate of TCP data frames transmitted from the TCP transmission devices 11 and 12 of the first network 7. Here, upon transmitting the delayed TCP ACK frame, a delay time is calculated in consideration of an RTT value between the reception system 50 and a destination terminal for a TCP frame and the receive buffer (window) size of the destination terminal. Further, the RTT between the reception system 50 and the destination terminal for the TCP frame and the receive buffer size of the destination terminal may be set by the transmission system 20. Furthermore, a source IP address field in the IP header of the TCP ACK frame is set to the IP address of the device of the second network, the TCP session of which is established with the device of the first network, rather than the IP address of the transmission system 20.

Meanwhile, in FIG. 4, the reception system 50 includes an interface integration module unit 60 and an application program 70. The interface integration module unit 60 is disposed between layer 2 (e.g., a MAC layer in the OSI 7 layer model) and an upper layer (e.g., an IP layer in the OSI 7 layer model when a TCP/IP protocol stack is used). Such a reception system 50 has a third interface unit 75 connected to the second network 8 and a fourth interface unit 76 used to make a unidirectional connection to the second interface unit 46 of the transmission system 20. The interface integration module unit 60 manages the third interface unit 75 and the fourth interface unit 76. Further, the application layer of the reception system 50 includes an application program 70 for receiving TCP frames from the transmission system 20, establishing TCP sessions with the TCP reception devices 81 and 82 of the second network 8, and transmitting received TCP data. That is, the application program 70 of the reception system 50 receives TCP frames from the frame monitoring unit (component 1) 61 of the interface integration module unit 60, and manages a TCP session management table 71 so as to manage (e.g., establish or release) TCP sessions with the TCP reception devices 81 and 82, instead of the TCP transmission devices 11 and 12. In this case, the application program 70 may be regarded as an application program unit for storing application programs.

The interface integration module unit 60 of the reception system 50 includes a frame monitoring unit (component 1) 61 and an address setting unit (component 2) 62.

Figure 5:
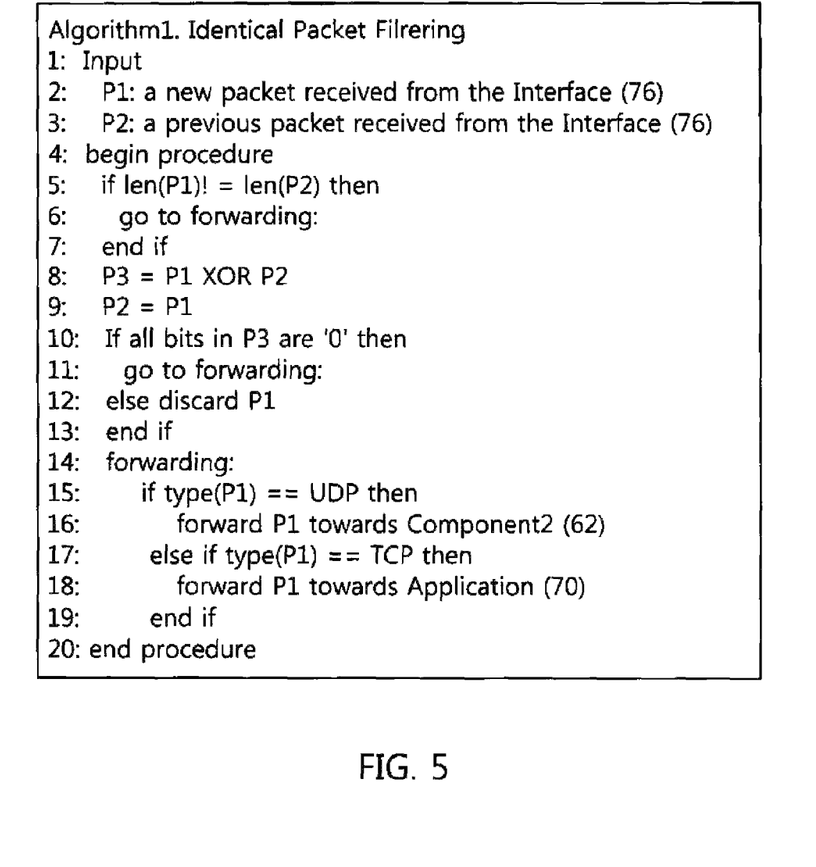
FIG. 5 is a diagram showing an example of an identical frame filtering algorithm applied to the present invention.

The frame monitoring unit 61 monitors data frames which the fourth interface unit 76 of the reception system 50 receives from the second interface unit 46. The frame monitoring unit 61 selects one from among identical frames of the data frames received from the transmission system 20. For this, the frame monitoring unit 61 may use an identical frame filtering algorithm illustrated in FIG. 5. The identical frame filtering algorithm illustrated in FIG. 5 has been devised based on the fact that the second interface unit 46 basically sequentially transmits identical data frames. Therefore, the frame monitoring unit 61 identifies a single frame for identical frames among the received frames, transfers the identified frame to the address setting unit 62 when the identified frame is a UDP frame, and transfers the identified frame to the application program 70 when the identified frame is a TCP frame.

The address setting unit 62 sets the destination MAC address of the received UDP frame to the MAC address of a next hop IP address determined via a typical routing scheme, and transfers the MAC address to the third interface unit 75. For example, when the destination IP address of the UDP frame is present in another subnet, the destination MAC address of the UDP frame may be set to the MAC address of a router to which the third interface unit 75 is coupled because the next hop IP address is the IP address of the router to which the third interface unit 75 is coupled.

In an embodiment of the present invention, when the interface integration module unit 30 of the transmission system 20 transmits a single data frame to the reception system 50, the single data frame may be transmitted in the form of a plurality of identical frames using remaining resources between the second interface unit 46 of the transmission system 20 and the fourth interface unit 76 of the reception system 50. The interface integration module unit 60 of the reception system 50 receives the plurality of identical frames and reconstructs the identical frames into a single frame, thus reducing a frame loss rate. That is, when a bit loss rate caused by a link error between the second interface unit 46 of the transmission system 20 and the fourth interface unit 76 of the reception system 50 is p, a frame loss rate predicted upon transmitting an n-bit frame is $1-(1-p)^n$, but if the identical frame is transmitted k times, the frame loss rate may be reduced to $(1-(1-p)^n)^k$.

As described above, the reception system 50, instead of the device of the first network 7, establishes or deletes a TCP session with the device of the second network 8. For this, the reception system 50 includes the application program 70 for establishing and deleting TCP sessions.

The interface integration module unit 60 of the reception system 50 receives one or more identical UDP or TCP frames from the fourth interface unit 76. In this case, the interface integration module unit 60 of the reception system 50 selects one from among the identical frames, and deletes the remaining frames. The interface integration module unit 60 transfers the received TCP frame to an upper layer and, if the received frame is a UDP frame, forwards the UDP frame to the third interface unit 75 so that the UDP frame is transferred to the device of the second network 8. In this case, the TCP frame is transferred to the application program 70. Meanwhile, the upper layer to which the TCP frame is transferred may be the IP layer or the application layer.

The destination MAC address of the UDP frame transferred to the third interface unit 75 may be the MAC address of a next hop IP address determined via a typical routing scheme, and transfers the MAC address to the third interface unit 75. For example, when the destination IP address of the UDP frame is present in another subnet, the destination MAC address of the UDP frame may be set to the MAC address of a router to which the third interface unit 75 is coupled because the next hop IP address is the IP address of the router to which the third interface unit 75 is coupled.

Meanwhile, the application program 70 of the reception system 50, instead of the device of the first network 7, may establish or delete a TCP session with the device of the second network 8 using the IP header and the TCP header of the TCP frame. In this case, the application program 70 manages a TCP session to be established between the device of the first network 7 and the device of the second network 8, based on the information of the received TCP frame. In particular, the application program 70 may manage a TCP session management table 71, including a source IP address, a source port, a destination IP address, a destination port, an RTT2, a current state, and an expiration time in order to manage a TCP session, in the same manner as the interface integration module unit 30 of the transmission system 20.

In this case, the source IP address, the source port, the destination IP address, and the destination port respectively denote the IP address and port of the device of the first network 7 that made an, actual TCP session establishment request, and the IP address and port of the device of the second network 8 which corresponds to the destination of the actual TCP session. Further, RTT2 denotes a round trip time (RTT) between the transmission system 20 and the device of the second network 8 and may be periodically updated. The current state is used to track a TCP state transition, and the expiration time denotes a duration in which the current state is maintained. After the expiration time has elapsed, the corresponding entry is deleted from the TCP session management table 71.

Further, the current state may be composed of five states, that is, SYN_RCVD, SYN_ACK_RCVD, ESTABLISH, CLOSE_WAIT, and LAST_ACK.

If a new TCP SYN frame is received, the application program 70 starts to manage the TCP session. That is, if an entry matching the source IP address, the source port, the destination IP address, and the destination port of the TCP header and the IP header of the corresponding TCP SYN frame is not present in, the current TCP session management table 71 with reference to the TCP header and the IP header, the application program 70 newly generates an entry composed of the source IP address, the source port, the destination IP address, and the destination port, and inserts the generated entry into the TCP session management table 71. In this case, the application program 70 sets the current state of the entry to SYN_RCVD, sets an RTT2 value to −1, and sets a suitable expiration time. In this case, an available expiration time value may be set to a time for which a typical TCP layer transmits a TCP SYN frame to establish a TCP session and waits for a TCP SYN/ACK frame to be received.

In this way, when the new entry is generated (for example, when a new TCP SYN frame is received from the transmission system 20), the application program 70 establishes a TCP session with the device of the second network having the destination IP address and destination port information of the corresponding entry. In this case, the source IP address and source port of the TCP session may be set to the source IP address and source port of the corresponding entry, or to the IP address and specific port of the reception system 50. In this way, when the new entry is generated, the application program 70 allocates a buffer (TCP session buffer) to the TCP session to be established, and then initializes the buffer.

Meanwhile, if a TCP SYN/ACK, frame is received, the application program 70 updates the TCP session. In this case, the application program 70 sets the current state of the entry to SYN_ACK_RCVD, sets an RTT2 value to −1, and sets a suitable expiration time in the similar manner.

Meanwhile, if a TCP ACK frame is received, the application program 70 updates the TCP session. In this case, the application program 70 sets the current state of the entry to 'ESTABLISH', and sets an expiration time to −1.

Further, if a TCP FIN frame is received, the application program 70 updates the TCP session. In this case, the application program 70 sets the current state of the entry to 'CLOSE_WAIT' and sets a suitable expiration time in the similar manner.

Furthermore, if a TCP FIN/ACK frame is received, the application program 70 updates the TCP session. In this case, the application program 70 sets the current state of the entry to 'LAST_ACK' and sets a suitable expiration time in the similar manner.

Furthermore, if a TCP ACK frame is received, the application program 70 updates the TCP session, and may delete the corresponding entry from the TCP session management table 71. Further, the application program 70 terminates the TCP session that has been established with the device of the second network 8.

If an expected TCP control frame in each state of the entry is not received by the expiration time, the application program 70 completely transfers all of data remaining in the TCP session buffer of the corresponding entry if the data remains in the TCP session buffer, and deletes the entry from the TCP session management table 71. The application program 70 releases the TCP session that has been established with the device of the second network 8. In this case, the buffer performs a function similar to that of a TCP receive buffer on a receiving side. That is, the TCP session buffer of the corresponding entry sequentially stores TCP data frames received from the transmission system 20 in consideration of the sequence number of TCP headers.

Further, when data is present in the head of each TCP session buffer, the application program 70 extracts the data, eliminates the IP header and the TCP header of the data, and transfers resulting data to the device of the second network 8 through the third interface unit 75 using the established TCP session. Thereafter, the application program 70 deletes the data of the head, moves the head to a next location, and repeats the above-described operating procedure. If data is not present in the head, the application program waits until data is received from the transmission system 20. In this case, the source IP address of the frame transmitted via the TCP session is set to the IP address of the reception system 50. That is, the TCP frame may be transferred to the TCP reception device 81 or 82 through the third interface unit 75 using a typical routing scheme.

Meanwhile, the application program 70 of the reception system 50 checks each buffer (TCP session buffer) of the TCP session management table 71. If a TCP data frame corresponding to a specific sequence is not received for a sufficient time (that is, if it is determined that frame loss has occurred in a specific TCP session), the application program may record such frame loss as log, or may send a warning message to a management tool. In this case, the log and the warning message may include information such as the IP address and port of the TCP transmission device, the IP address and port of the TCP reception device, the amount of data that has been received to current time, and a sequence number in which loss has occurred. The management tool may be present in the device of the second network 8.

In addition, the application program 70 of the reception system 50 may record the information of the TCP session management table 71 as log, or send a notification message of the information to the management tool. In this case, the log and the notification message may include information such as the IP address and port of the TCP transmission device, the IP address and port of the TCP reception device, the RTT2, and the amount of data that has been transmitted.

In FIG. 4, although the configuration and operating procedure of a case where the single transmission system 20 and the single reception system 50 are present have been described, such an example may be extended to a structure in which a single transmission system and a plurality of reception systems are present, or to a structure in which a plurality of transmission systems and a plurality of reception systems are present.

Figure 6:
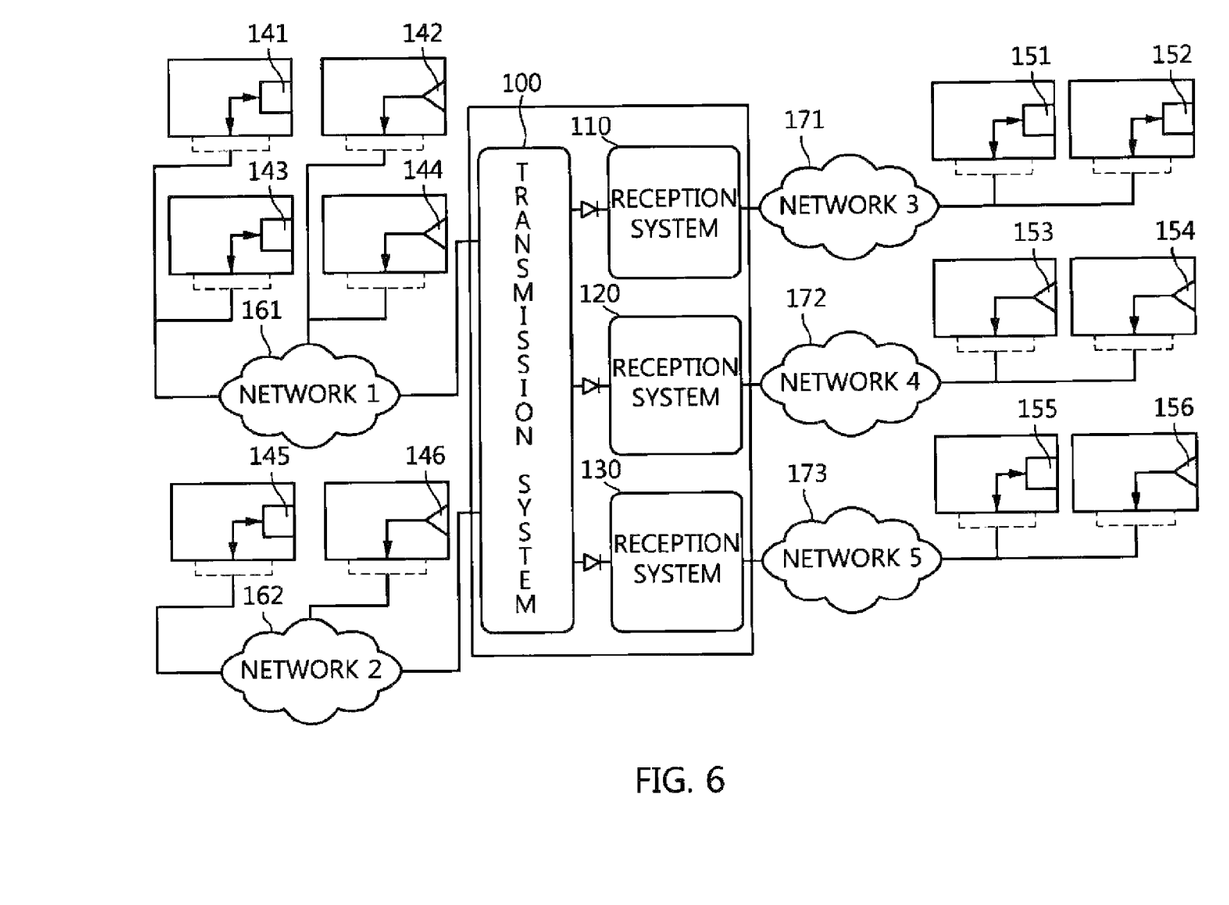
FIG. 6 is a diagram showing an extended example of a one-way data transmission system and a one-way data reception system according to the embodiment of the present invention.

FIG. 6 is a diagram showing an extended example of the one-way data transmission system and the one-way data reception system according to the embodiment of the present invention, and illustrates the overall structure of a system composed of a single transmission system 100 and three reception systems 110, 120, and 130.

The first interface unit (not shown) (that is, corresponding to the first interface unit 45 of FIG. 4) of the transmission system 100 includes two interfaces. The two interfaces are connected to a first network 161 and a second network 162, respectively.

The second interface unit (not shown) (that is, corresponding to the second interface unit 46 of FIG. 4) of the transmission system 100 includes three interfaces. The three interfaces are connected to the fourth interface units (not shown) (corresponding to the fourth interface unit 76 of FIG. 4) of the respective reception systems 110, 120, and 130 through physical unidirectional lines.

Meanwhile, the three reception systems 110, 120, and 130 are respectively connected to a third network 171, a fourth network 172, and a fifth network 173 through a third interface unit (not shown) (that is, corresponding to the third interface unit 75 of FIG. 4).

Further, devices 141 to 146 located in the first network 161 and the second network 162 transfer data frames to or from the devices 151 to 156 of the third network 171, the fourth network 172, and the fifth network 173 using TCP or UDP. For example, the device 141 transmits a data frame to the device 151 using TCP.

In this way, in order to improve a data reception rate in an environment in which the plurality of reception systems 110, 120, and 130 are present, there is a need to extend the interface integration module unit of the existing transmission system.

First, for data frames to be transmitted, the interface integration module unit of the transmission system determines the number of identical data frames to be transmitted for the purpose of improving a reception rate, in consideration of the residual capacity of the interface buffer of the second interface unit to which the frames are to be transmitted.

Second, upon calculating a delay time required when the interface integration module unit of the transmission system delays and transmits a TCP ACK frame to the TCP transmission device, the following procedure is performed. In the above Equation (1), n denotes the total number of TCP sessions that are currently established, but, in an environment in which the plurality of reception systems 110, 120, and 130 are present, n denotes the number of TCP sessions that are established in a specific reception system. For example, when the TCP reception device of a specific TCP session is a device 151 belonging to the third network 171, the TCP frame is transferred using the reception system 110. In this case, n in Equation (1) is 2. For this, identifiers required to identify the fourth interface units of the respective reception systems 110, 120, and 130 are inserted into the TCP session management table of the interface integration module unit of the existing transmission system. For example, the identifiers may be the specific interface MAC addresses of the fourth interface units of the respective reception systems 110, 120, and 130.

Figure 7:
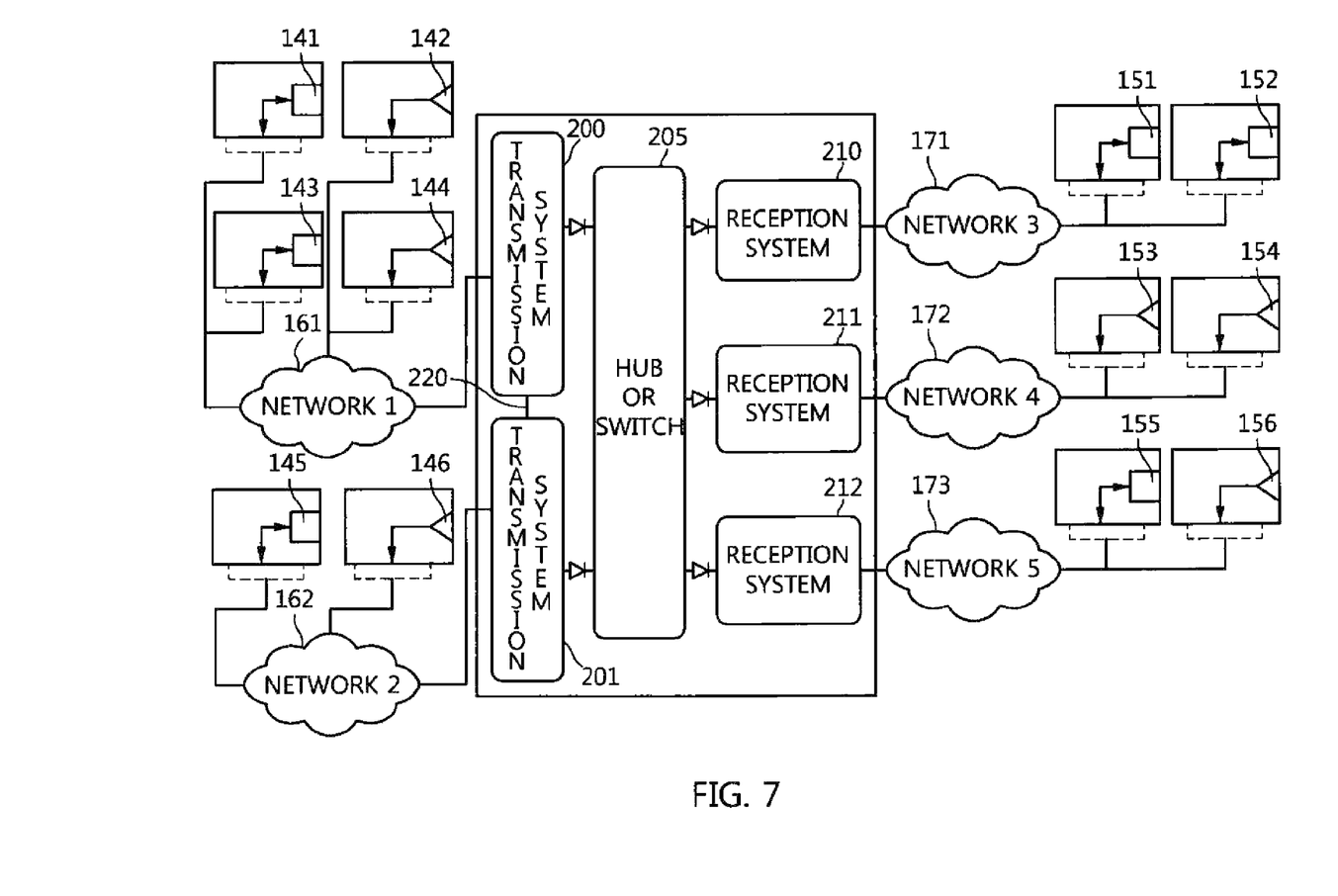
FIG. 7 is a diagram showing another extended example of a one-way data transmission system and a one-way data reception system according to the embodiment of the present invention.

FIG. 7 is a diagram showing another extended example of the one-way data transmission system and the one-way data reception system according to the embodiment of the present invention, and illustrates a structure in which a plurality of transmission systems 200 and 201 and a plurality of reception systems 210, 211, and 212 are used.

A hub or switch 205 is disposed between the transmission systems 200 and 201 and the reception systems 210, 211, and 212.

The hub or switch 205 receives data from the transmission systems 200 and 201 through a physical unidirectional line, and transmits data to the corresponding reception system (one of 210, 211, and 212) through a physical unidirectional line. In this case, when the interface integration module unit (not shown) of the transmission system 200 calculates a delay time for the delayed transmission of a TCP ACK frame via a first interface unit (not shown), the information of the TCP session management table of another transmission system 201 must be obtained so as to calculate n. For this, an interface 220 for information exchange between the interface integration module units of the transmission systems 200 and 201 is required. The information exchange between the interface integration module units of the transmission systems 200 and 201 may be performed whenever a new TCP session is established or a current TCP session is deleted. Here, the interface 220 is managed by the interface integration module units.

In accordance with the present invention, a transmission system transmits an identical frame multiple times in consideration of the remaining resources of a unidirectional line connected to a reception system, and the reception system transfers only one of the identical frames to an upper layer, thus decreasing a frame loss rate.

Further, in order to reduce frame loss caused by a buffer overflow in the reception system, the transfer rate of a TCP transmission device connected to a transmission system is controlled in consideration of the throughput of a TCP session established by the reception system.

In other words, when the transmission system of a unidirectional line transmits data to a one-way reception system, identical data is transmitted a plurality of times depending on the importance level thereof, thus mitigating the problem of data loss caused by a link error in the unidirectional line.

Furthermore, the transmission system of a unidirectional line transmits a delayed ACK frame to the device of a first network, thus mitigating the problem of a buffer overflow that may occur in the reception system of the unidirectional line.

As described above, optimal embodiments of the present invention have been disclosed in the drawings and the specification. Although specific terms have been used in the present specification, these are merely intended to describe the present invention and are not intended to limit the meanings thereof or the scope of the present invention described in the accompanying claims. Therefore, those skilled in the art will appreciate that various modifications and other equivalent embodiments are possible from the embodiments. Therefore, the technical scope of the present invention should be defined by the technical spirit of the claims.

What is claimed is:

1. A one-way data transmission system comprising:
a first interface unit connected to a first network to transmit and receive data frames;
a second interface unit unidirectionally connected to a reception system connected to a second network to transmit and receive data frames; and
an interface integration module unit for transmitting a delayed Transmission Control Protocol (TCP) Acknowledgement (ACK) frame to a TCP session established with a device of the first network unit through the first interface unit, and transmitting one or more identical data frames to the reception system through the second interface unit,
wherein the interface integration module unit comprises:
a frame monitoring unit for monitoring whether a frame received from the first interface unit is an accepted frame, transferring an accepted frame to a frame generation unit if the accepted frame is a User Datagram Protocol (UDP) frame, and transferring the accepted frame to the frame generation unit and to a management unit if the accepted frame is a TCP frame;
the frame generation unit for generating one or more identical frames for the frame received from the frame monitoring unit, and transferring the identical frames to the second interface unit; and
the management unit for managing a TCP session to be established between a device of the first network and a device of the second network, based on the TCP frame received from the frame monitoring unit.

2. The one-way data transmission system of claim 1, wherein the frame monitoring unit is configured to, if the received frame is a frame corresponding to a session included in a preset whitelist, determine the frame to be the accepted frame and to, if the accepted frame is a UDP frame, recalculate a data transfer rate for a current UDP session, and transfer the UDP frame to the frame generation unit when the recalculated data transfer rate is less than a data transfer rate accepted for the corresponding session.

3. The one-way data transmission system of claim 1, wherein the frame generation unit is configured to, if the frame received from the frame monitoring unit is a TCP frame, generate one or more identical TCP frames based on a buffer state of the second interface unit.

4. The one-way data transmission system of claim 1, wherein the frame generation unit is configured to, if the frame received from the frame monitoring unit is a UDP frame, generate one or more identical UDP frames based on a buffer state of the second interface unit and an importance level of the UDP frame.

5. The one-way data transmission system of claim 1, wherein the frame generation unit sets a destination Media Access Control (MAC) address of a frame to be transmitted to the second interface unit to a MAC address of a fourth interface unit of the reception system unidirectionally connected to the second interface unit, and transfers the frame to the second interface unit.

6. The one-way data transmission system of claim 5, wherein when the second interface unit and the fourth interface unit perform one-way communication via a wireless link, the frame generation unit sets a destination MAC address of a frame to be transmitted to the second interface unit to a broadcast MAC address, and transfers the frame to the second interface unit.

7. The one-way data transmission system of claim 1, wherein the interface integration module unit further includes a TCP session management table including a source IP address indicating an IP address of a device of the first network that made an actual TCP session establishment request, a source port indicating a port of the device of the first network that made the actual TCP session establishment request, a destination IP address indicating an IP address of a device of the second network that is a destination IP address of the actual TCP session, a destination port indicating a port of a device of the second network that is a destination port of the actual TCP session, an RTT1 indicating a round trip time (RTF) between the device of the first network and the transmission system, a current state used to track TCP state transition, and an expiration time indicating a duration in which the current state is maintained.

8. The one-way data transmission system of claim 7, wherein the management unit is configured to, if a TCP ACK frame is received from an upper layer, search the TCP session management table for an entry corresponding to a destination IP address and a destination port of an IP header and a TCP header of the TCP ACK frame and obtain the RTT1, and to, if the RTT1 is greater than an NRTT indicating an RTT required between the transmission system and a TCP transmission device of the first network, set a delay time for the TCP ACK frame to "0 (zero)" and if the RTT1 is less than the NRTT, set the delay time for the TCP ACK frame to "NRTT−RTT1".

9. The one-way data transmission system of claim 1, further comprising an application program unit for storing an application program required to establish or delete a TCP session with a device of the first network.

10. A one-way data reception system comprising:
a third interface unit connected to a second network to transmit and receive data frames;
a fourth interface unit unidirectionally connected to a second interface unit of a transmission system connected to a first network through a first interface unit to transmit and receive data frames;
an interface integration module unit configured to select one from among identical data frames of data frames received from the second interface unit of the transmission system received through the fourth interface unit; and
an application program unit configured to receive a TCP frame from the interface integration module unit and establish a TCP session with a device of the second network,
wherein the interface integration module unit comprises:
a frame monitoring unit for identifying a single frame among the identical frames of the received data frames transferring the identified frame to an address setting unit if the identified frame is a UDP frame, and transferring the identified frame to the application program unit if the identified frame is a TCP frame; and
the address setting unit for setting a destination MAC address of the received UDP frame to a MAC address of a next hop IP address, and transferring the MAC address to the third interface unit.

11. The one-way data reception system of claim 10, wherein the application program unit establishes or deletes a TCP session with a device of the second network using an IP header and a TCP header of the received TCP frame, and manages a TCP session to be established between a device of the first network and a device of the second network, based on information of the received TCP frame.

12. The one-way data reception system of claim 10, wherein the application program unit further includes a TCP session management table including a source IP address indicating an IP address of a device of the first network that made an actual TCP session establishment request, a source port indicating a port of the device of the first network that made the actual TCP session establishment request, a destination IP address indicating an IP address of a device of the second network that is a destination IP address of the actual TCP session, a destination port indicating a port of a device of the second network that is a destination port of the actual TCP session, an RTT2 indicating a round trip time (RTT) between the transmission system and a device of the second network, a current state used to track TCP state transition, and an expiration time indicating a duration in which the current state is maintained.

13. The one-way data reception system of claim 12, wherein the application program unit is configured to, if a new TCP synchronization (SYN) frame is received, check whether an entry matching the source IP address, the source port, the destination IP address, and the destination port is present in the TCP session management table, with reference to a TCP header and an IP header of the new TCP SYN frame, and to, if the entry is not present in the TCP session management table, newly generate an entry including the source IP address, the source port, the destination IP address, and the destination port and insert the newly generated entry into the TCP session management table.

14. The one-way data reception system of claim 13, wherein when the new entry is generated, the application program unit establishes a TCP session with the device of the second network having information about the destination IP address and the destination port of the entry, allocates a buffer to the TCP session to be established, and initializes the buffer.

15. The one-way data reception system of claim 14, wherein the application program unit is configured to, if data is present in a head of the buffer, extract the data, eliminate an IP header and a TCP header from the data, and transfer resulting data to the device of the second network through the third interface unit using the established TCP session.

16. The one-way data reception system of claim 12, wherein the application program unit records information of the TCP session management table as log or sends a notification message to a management tool.

17. The one-way data reception system of claim 10, wherein the application program unit is configured to, if it is determined that frame loss has occurred in a specific TCP session, record frame loss as log or send a warning message to a management tool.

* * * * *